United States Patent
Felix et al.

(10) Patent No.: US 10,613,833 B2
(45) Date of Patent: Apr. 7, 2020

(54) GENERATING RANDOMNESS IN NEURAL NETWORKS

(71) Applicant: Graphcore Limited, Bristol (GB)

(72) Inventors: Stephen Felix, Bristol (GB); Godfrey Da Costa, Bristol (GB)

(73) Assignee: Graphcore Limited, Bristol (GB)

( * ) Notice: Subject to any disclaimer, the term of this patent is extended or adjusted under 35 U.S.C. 154(b) by 43 days.

(21) Appl. No.: 15/886,505

(22) Filed: Feb. 1, 2018

(65) Prior Publication Data

US 2019/0121616 A1    Apr. 25, 2019

(30) Foreign Application Priority Data

Oct. 20, 2017    (GB) .................................... 1717309.7

(51) Int. Cl.
| | |
|---|---|
| *G06F 7/58* | (2006.01) |
| *G06F 5/01* | (2006.01) |
| *G06F 7/501* | (2006.01) |
| *G06N 3/08* | (2006.01) |
| *G06N 3/04* | (2006.01) |

(52) U.S. Cl.
CPC ................ *G06F 7/582* (2013.01); *G06F 5/01* (2013.01); *G06F 7/501* (2013.01); *G06N 3/04* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 3,984,668 | A | 10/1976 | Zetterberg et al. |
| 4,218,749 | A | 8/1980 | Babaud et al. |
| 2003/0177155 | A1 | 9/2003 | Shackleford |
| 2014/0270162 | A1* | 9/2014 | Greiner ................. H04L 9/0643 380/46 |
| 2015/0095274 | A1* | 4/2015 | Lamb ..................... G06N 3/049 706/25 |
| 2017/0220322 | A1* | 8/2017 | Vaish ...................... G06F 7/588 |
| 2019/0012144 | A1* | 1/2019 | Harada ................... G06F 7/582 |

(Continued)

FOREIGN PATENT DOCUMENTS

| | | |
|---|---|---|
| GB | 2 076 570 A | 12/1981 |
| JP | H03-117209 A | 5/1991 |
| JP | H05216630 | 8/1993 |

(Continued)

OTHER PUBLICATIONS

Cha et al., H-BSP: A Hierarchical BSP Computation Model. The Journal of Supercomputing, Feb. 2001;18(2):179-200.

(Continued)

*Primary Examiner* — David H Malzahn
(74) *Attorney, Agent, or Firm* — Haynes and Boone, LLP

(57) ABSTRACT

The present relates to invention deals with an execution unit configured to execute a computer program instruction to generate random numbers based on a predetermined probability distribution. The execution unit comprises a hardware pseudorandom number generator configured to generate at least randomised bit string on execution of the instruction and adding circuitry which is configured to receive a number of bit sequences of a predetermined bit length selected from the randomised bit string and to sum them to produce a result.

20 Claims, 7 Drawing Sheets

(56) References Cited

U.S. PATENT DOCUMENTS

2019/0121616 A1\* 4/2019 Felix .................. G06F 7/582

FOREIGN PATENT DOCUMENTS

| JP | 2000276459 A | 10/2000 |
|----|---|---|
| JP | 2003323292 | 11/2003 |
| JP | 2005-038229 A | 2/2005 |
| JP | 2009049547 | 3/2009 |
| JP | 2016541038 | 12/2016 |
| KR | 1020070048641 | 5/2007 |
| WO | WO 2018/184205 A1 | 10/2018 |

OTHER PUBLICATIONS

Kapre et al., An NoC Traffic Compiler for Efficient FPGA Implementation of Sparse Graph-Oriented Workloads. International Journal of Reconfigurable Computing. vol. 2011 (2011), Article ID 745147. 15 pages.
Valiant, A bridging model for parallel computation. Communications of the ACM, Aug. 1990;33(8):103-11.
Extended European Search Report for European Application No. 18200110.7, dated Mar. 6, 2019.
Combined Search and Examination Report for British Application No. GB1717309.7, dated Mar. 25, 2019.
Office Action for Canadian Patent Application No. 3,021,415 dated Nov. 13, 2019.
Office Action for Japanese Patent Application No. 2018-197148 dated Feb. 18, 2020.
Office Action for Korean Patent Application No. 10-2018-01 25337 dated Jan. 9, 2020.

\* cited by examiner

GENERATING RANDOMNESS IN NEURAL NETWORKS

CROSS-REFERENCE TO RELATED APPLICATIONS

This application claims the priority benefit under 35 U.S.C. § 119 of United Kingdom Patent Application No. 1717309.7, filed Oct. 20, 2017, the entire contents of which are incorporated herein by reference.

TECHNICAL FIELD

The present disclosure relates to generating randomness in neural networks.

BACKGROUND

Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason the nodes are often referred to as neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to each node in the hidden layer. Each node in the hidden layer can perform an activation function on the data which is provided to them and can generate similarly an output vector which is supplied to each of the nodes $N_O$ in the output layer $_O$. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighing it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back propagated error and produces a revised set of weights. In this way, the network can be trained to perform its desired operation.

One problem which can arise with a neural network is "overfitting". Large networks with millions or billions of parameters (weights) can easily overfit. Overfitting causes a network to remember each training sample that has been provided to it (a training sample providing data to the input nodes), rather than be trained to extract relevant features so that the neural net is appropriate, after it has been trained, for application to more generally extract features from samples. A wide range of techniques has been developed to solve this problem by regularising neural networks to avoid overfitting/memorising.

When processing large datasets using neural nets, there are techniques involving the use of random numbers which can improve their performance. One technique is so-called Monte Carlo sampling which is a term used for a broad class of computational algorithms that rely on repeated random sampling to obtain numerical results. The underlying idea of Monte Carlo sampling is that randomness may be able to solve problems that might be deterministic in principle. When using Monte Carlo sampling, a prescribed probability distribution of the random numbers is desirable. Monte Carlo sampling can be used for example in generative models.

Techniques have recently been devised for improving the performance of neural nets by adding random noise to weights or activations. Gaussian noise has been explored as a possibility in this respect.

Implementing neural networks using known computer technology has various challenges. Implementing randomising techniques, for example using a CPU or GPU is non-trivial and may impact the full benefits that could be achieved with efficient implementation.

SUMMARY

The present inventors have developed an execution unit for a processor which can efficiently provide, responsive to execution of a program instruction, random values from a predetermined, almost Gaussian, distribution.

According to one aspect of the invention there is provided an execution unit configured to execute a computer program instruction to generate random numbers based on a predetermined probability distribution, the execution unit comprising:

a hardware pseudorandom number generator configured to generate at least one randomised bit string on execution of the instruction;

adding circuitry configured to receive a number of bit sequences of a predetermined bit length selected from the randomised bit string and to sum them to produce a result.

The execution unit can include normalising circuitry configured to receive the result and to generate a normalised result to centre the predetermined probability distribution at a selected known value and/or to adjust the variance of the distribution to a selected known value.

The hardware pseudorandom number generator may be configured to generate two or more randomised bit strings on execution of the instruction, and the adding circuitry may be configured to produce two or more results from two or more respective summations.

In one embodiment, the normalising circuitry comprises a lookup table configured to receive each result and to provide the normalised result. However, any implementation may be utilised. The normalising circuitry can carry out the functions of subtracting a predetermined number from the result, the predetermined number being calculated as half the total possible number range of results produced by the adding circuitry, converting to a floating point format and dividing by a divisor. The divisor can be the number of any possible values of uniformly distributed random variables having the predetermined bit length.

In one embodiment, the number of bit sequences is twelve. The number twelve has been found to be a good compromise for the number of bit sequences taking into account the required distribution, and hardware optimisation for certain applications. The distribution can be an Irwin-Hall distribution. Each sequence may have any suitable number of bits. It is five in the described embodiment, but this by way of non limiting example only.

The normalising circuitry may be configured to subtract 186 from the result (where the number range of results is 372).

The execution unit can comprise summing circuitry which sums together results from a plurality of the computer program instructions to more accurately fit the predetermined probability distribution. It may further comprise circuits for combining the outputs from the pseudorandom number generator with the results from the computer program instruction.

A corresponding method and computer program are also provided.

One aspect provides a method of executing a computer program instruction to generate random numbers based on a predetermined probability distribution, the method comprising:

generating at least one randomised bit string on execution of the instruction;

selecting a number of bit sequences of a predetermined bit length from the randomised bit string and summing them to produce a result. Another aspect provides a computer program product comprising a computer program which comprises a computer program instruction recorded on a non transmissible medium which when executed carries out the aforementioned method.

For a better understanding of the present invention and to show the same may be carried into effect, reference will now be made by way of example only to the following drawings.

DETAILED DESCRIPTION

Figure 1:
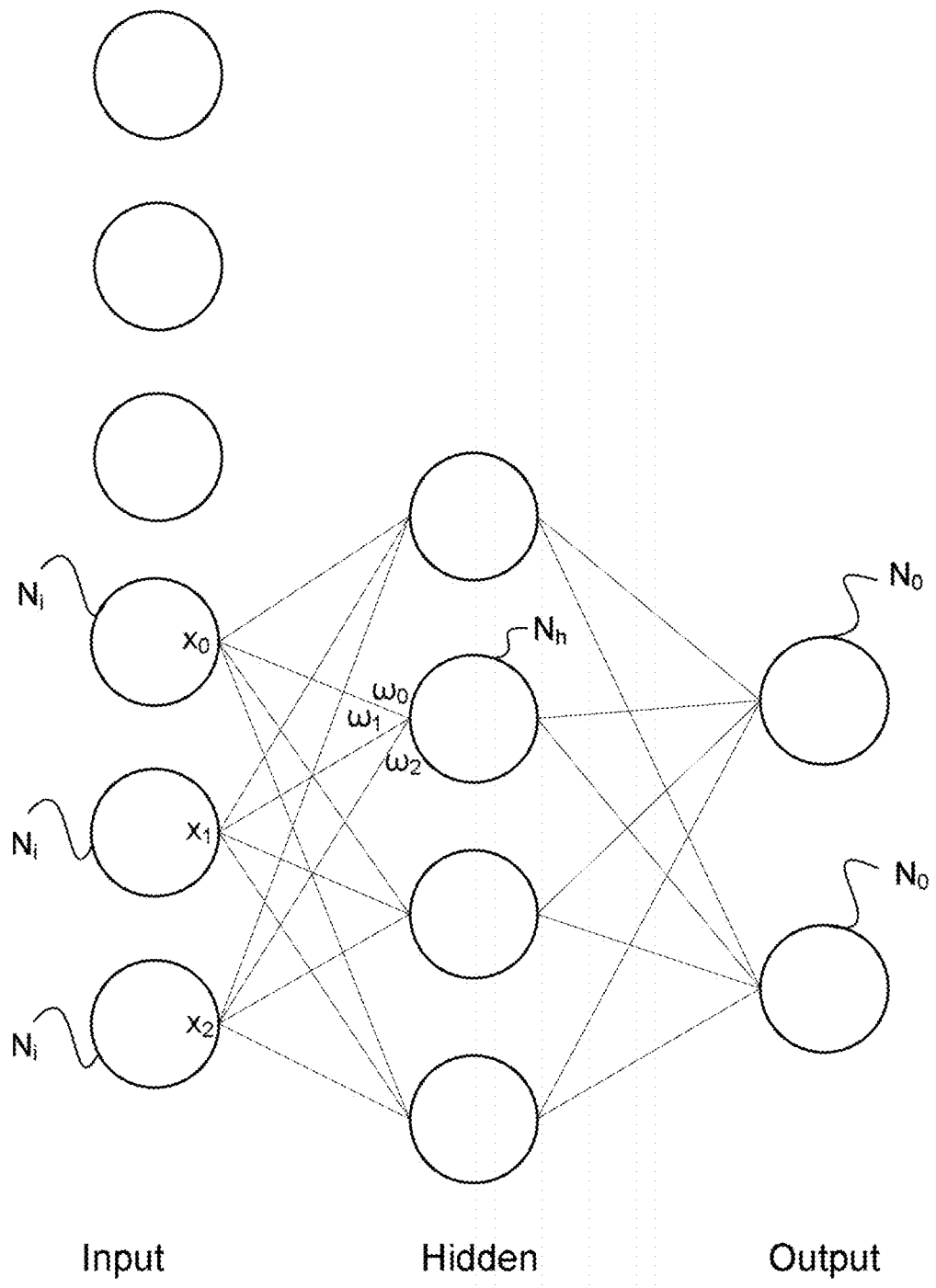
FIG. 1 is a highly simplified schematic view of a neural net.
Figure 1A:
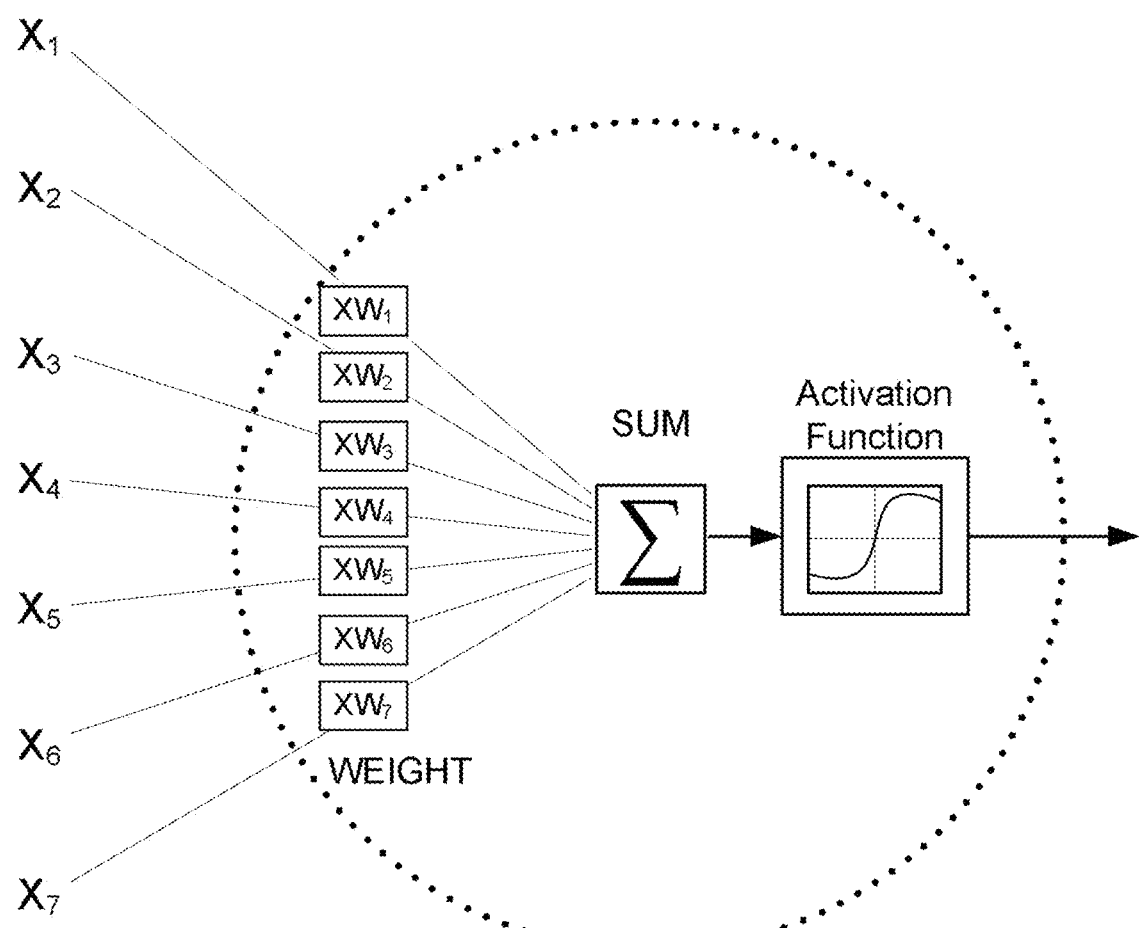
FIG. 1A is a highly simplified schematic view of a neuron.
Figure 2:
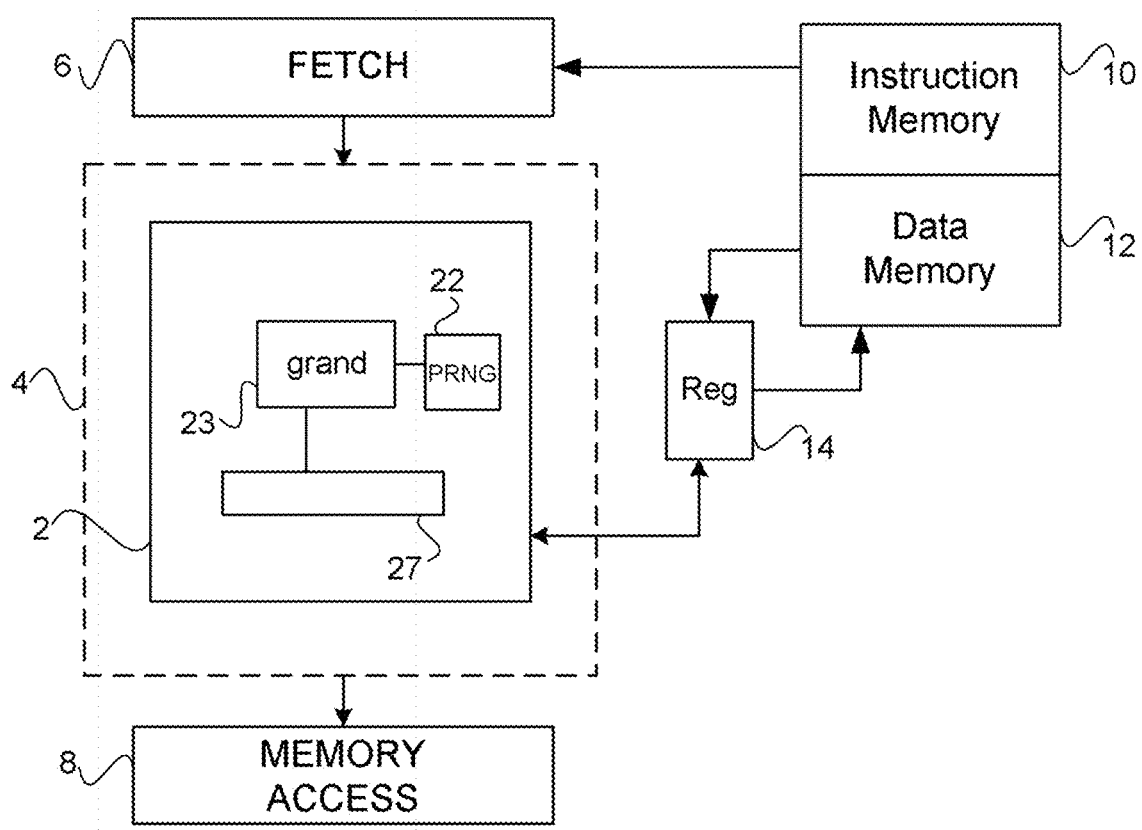
FIG. 2 is a schematic diagram of a processing unit in accordance with an embodiment of the invention.

FIG. 2 shows a schematic block diagram of an execution unit arranged to execute a single instruction for generating random values from a predetermined probability distribution. The instruction is referred to herein as the grand instruction.

The execution unit 2 forms part of a pipeline 4 in a processing unit. The processing unit comprises an instruction fetch unit 6 which fetches instruction from an instruction memory 10. The processing unit also comprises a memory access stage 8 which is responsible for accessing a data memory 12 for loading data from the memory or storing data into the memory. A set of registers 14 is provided for holding source and destination operands for the instructions being executed at any instance by the pipeline 4. It will readily be understood that the pipeline 4 may contain many different types of execution unit for executing a variety of different instructions, for example for performing mathematical operations. One type of processing unit which may be useful with the present invention is a processing unit using barrel-threaded time slots, in which a supervisor thread may allocate different worker threads to different time slots for their execution. The grand instruction described herein may be used with any suitable processing unit architecture.

The execution unit 2 comprises a hardware pseudo random number generator 22 which generates pseudo random numbers when requested by the instruction. The numbers each take the form of a randomised sequence of 64 bits. The execution unit 2 also comprises a grand instruction execution module 23 and an output buffer 27 for holding the result of execution of the instruction.

Figure 3:
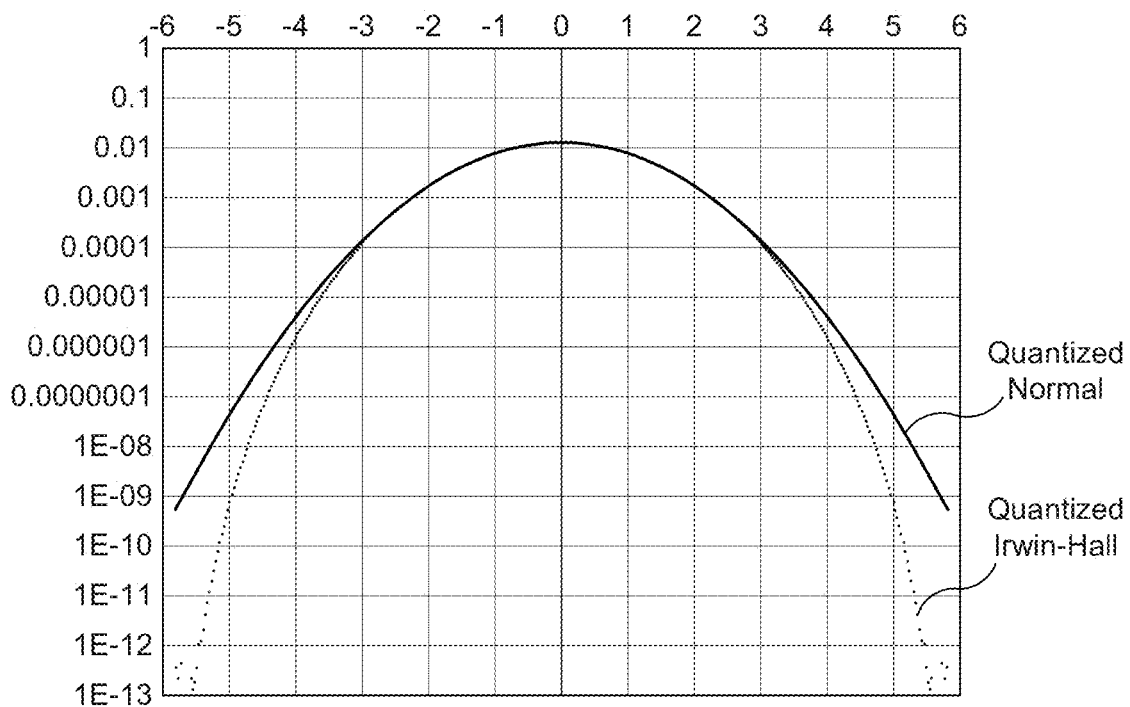
FIG. 3 shows on a log and normal plot the difference between a normal Gaussian distribution and an Irwin-Hall distribution.
Figure 3:
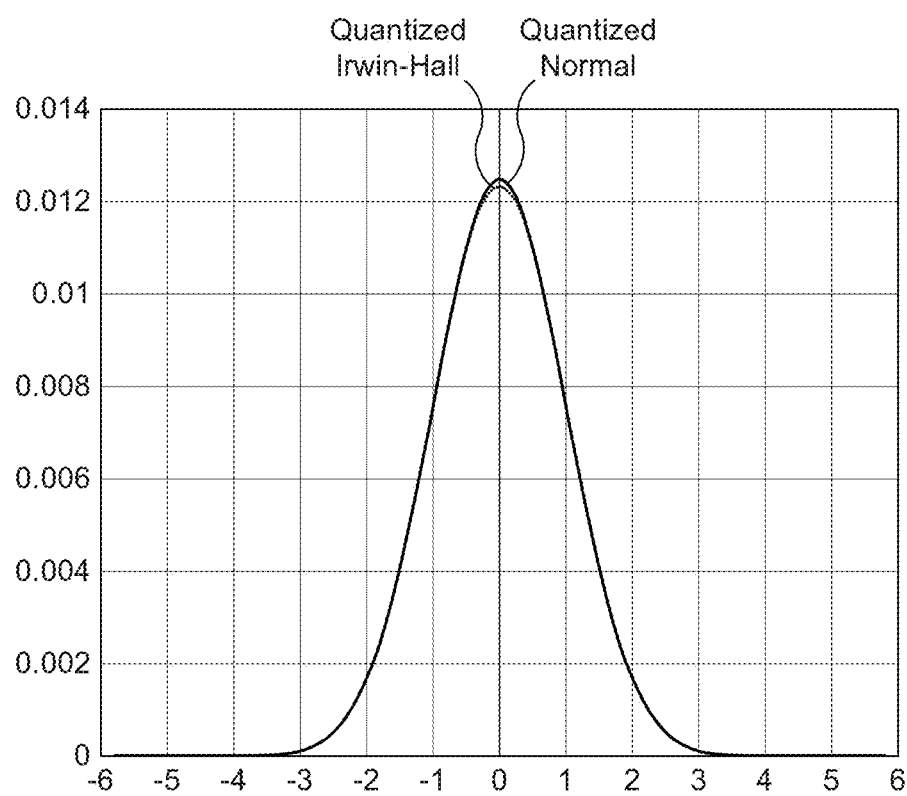

There are two versions of the instruction. The first, f16v2grand$aDST returns two random 16-bit values from a predetermined probability distribution of random values into a register or memory location DST. A second version of the instruction f32v2grand$aDST returns two 32-bit values from the same distribution into a register or memory location DST. The technique implemented by the grand instruction module 23 provides a distribution which is close to an Irwin-Hall distribution. As explained herein, the Irwin-Hall distribution is very similar to a Gaussian in distribution. The Irwin Hall Distribution is a probability distribution for a random variable defined as the sum of a number of independent random variables each having a uniform distribution. It is sometimes referred to as the uniform sum distribution, although it has Gaussian characteristics. FIG. 3 illustrates a quantized Irwin-Hall distribution where the number of independent random variables which are summed is 12 compared to a quantized normal distribution. This compares closely to a curve of Gaussian distribution shown with a variance of one and a mean of zero. The top graph in FIG. 3 is on a log scale, and the lower graph is on an ordinary scale. The probability density function (PDF) is within 20% of Gaussian up to 3 sigma. The cumulative distribution function (CDF) probability differs from Gaussian by less than +/−0.0024 (about 1%). To all intents and purposes it is a distribution of random numbers which serves the purposes described above for improving the performance of neural nets in a very satisfactory manner.

Figure 4:
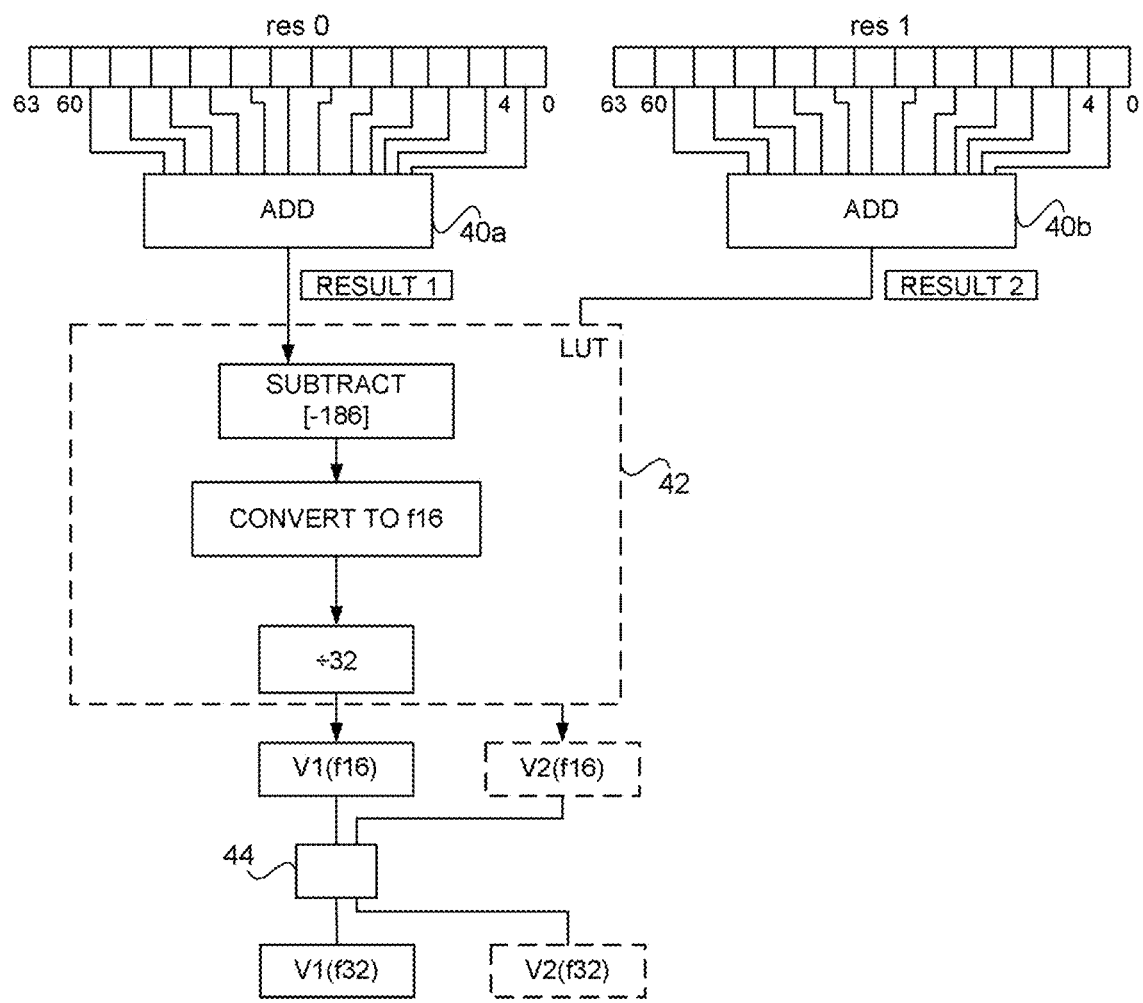
FIG. 4 is a block diagram of an execution unit for implementing the masking instruction.

In the described embodiment, when the grand instruction is executed by the execution unit the PRNG 22 produces two 64-bit wide outputs res 0, res 1. It will be understood that it would be possible to utilise the principle of the present invention with only a single output being produced, but it is more efficient for two outputs to be produced so as to generate two random numbers responsive to a single instruction. The intermediate 64-bit wide PRNG outputs res 0, res 1 are compressed to nine bits by summing twelve constituent 5 bit fields as indicated below. FIG. 4 illustrates schematically the addition function represented below as being implemented by two adders 40a, 40a, each adder receiving input sequences from a respective randomised bit string. Each adder has twelve inputs, and each input is 5 bits wide. The top 4 bits of each input string is discarded.

```
assign rsum0[8:0] = res0[4:0] + res0[9:5] + res0[14:10] +
res0[19:15] + res0[24:20] + res0[29:25] +
res0[34:30] + res0[39:35] + res0[44:40] +
res0[49:45] + res0[54:50] + res0[59:55] +
assign rsum1[8:0] = res1[4:0] + res1[9:5] + res1[14:10] +
res1[19:15] + res1[24:20] + res1[29:25] +
res1[34:30] + res1[39:35] + res1[44:40] +
res1[49:45] + res1[54:50] + res1[59:55] +
```

The resulting unsigned 9 bit sums (RESULT 1, RESULT 2) are in the range 0 to 372 inclusive. It will be understood that different number ranges could be produced by selecting a different number of bit sequences from the randomised bit strings, and also by changing the number of bits within each bit sequence. For any particular number of sequences/length of sequence, the adders will produce a set of results in a defined number range.

Two twelve input adders are shown for convenience, although it will be appreciated that other adding circuitry configurations may be utilised. The choice of summing 12 uniformly distributed random variables is an optimisation based on:
1) a reasonable trade-off between closeness to a normal (Gaussian) distribution and hardware cost; and
2) doing so happens to produce a distribution with a standard deviation of 1 rather than an awkward fraction, which simplifies the hardware needed to scale the integer to a floating point value with standard deviation of 1.

The summation results RESULT 1, RESULT 2 are then processed in normalising circuitry 42 so as to provide a normalised curve. Without this normalisation, the number range of the results would extend from 0 to 372 and would not be centred around 0. The normalising circuitry performs a subtract function which subtracts 186 from the result to recentre to the range on 0. This number 186 is a half of 372. It will be appreciated that if there was a different number range, there would be a different subtraction value (half the number range).

The results should be in floating point format to correspond to the required precision, as shown in the convert to f16 block in the normalising circuitry 42?

A divide stage divides the floating point numbers by 32 to produce a distribution with very similar attributes to a standard normal distribution (in particular to approximate the standard deviation as close as possibly to 1). Division by 32 is simple to achieve in binary arithmetic since, being a power of 2, it requires a fixed shift or exponent adjustment. 32 is the number of possible values of a single, 5-bit uniformly distributed random variable. Note that if the number of n of selected sequences was not 12, it would need to scaled by 32n/12.

In the described embodiment, the normalising circuitry is implemented by lookup table 42. However, it will be appreciated that it could be implemented in any suitable form. In one arrangement, the lookup table can be synthesised into logic gates.

As mentioned above, there are two versions of the instruction. The version which has been described above is f16v2grand. In the alternate version f32v2grand, the output is two f32 values instead of two f16 values. There is no need for another lookup table or similar, because the bits of the required f32 output values can be derived from the respective f16 results V1, V2 according to the following manipulations, carried out by conversion logic 44.

```
assign f32result0[31:0] =
    {fpresult0[15:14],4'{fpresult0[13]},fpresult0[12:3],16'b0};
assign f32result1[31:0] =
    {fpresult1[15:14],4'{fpresult1[13]},fpresult1[12:3],16'b0};
assign aDst[63:0] = {f32result1,f32result0};
```

Figure 6:
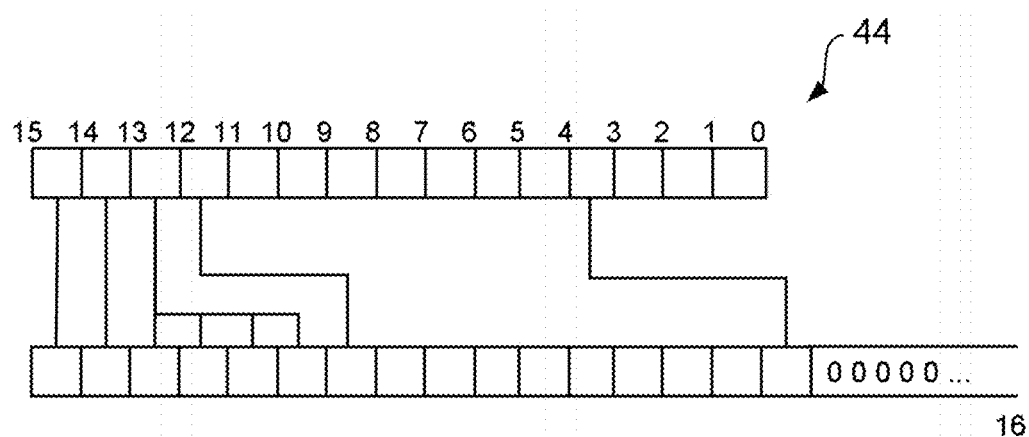
FIG. 6 illustrates conversion from an f16 value to an f32 value.

That is, a 32 bit sequence is derived by taking bits 14 and 15 of the VI (f16) result, replicating bit 13 4 times, taking bits 3 to 12 and completing with 16 zeroes. This is shown in FIG. 6.

Reverting to FIG. 3, each point on the graph represents one of the 384 possible values generated by summing twelve 5-bit values. The probability distribution function remains Gaussian up to approximately 3.5 sigma beyond which the tails of the distribution fade faster than would be the case in a normal distribution. The most extreme outputs are +/−5.8125 sigma, but with an extremely low probability. The closest known distribution is a continuous non-quantized 12th order Irwin-Hall distribution, but it will be understood that the particular distribution below is unique based on the manner by which it is generated.

Figure 5:
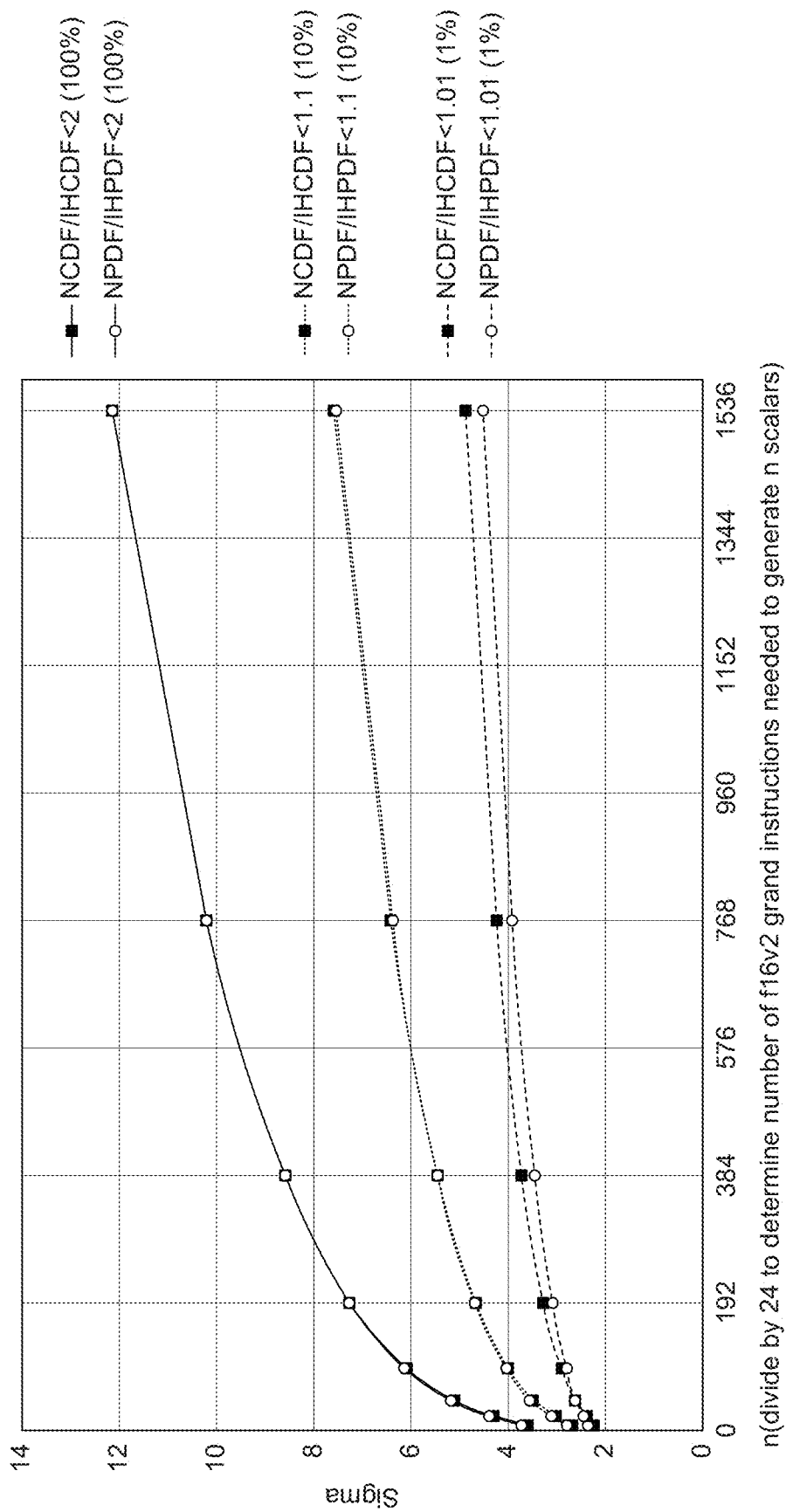
FIG. 5 shows the performance improvement by summing results of multiple grand instructions.

It is possible to more closely approximate to a normal distribution by summing pseudo Gaussian scalars from multiple grand instructions. As already mentioned, the tail of the Irwin-Hall probability distribution function diminish magnitude more rapidly than those of an ideal normal distribution. This can be remedied by summing multiple scalar outputs from multiple grand instructions. The curves in FIG. 5 show how many scalars need to be summed in order to achieve a probability distribution function (or cumulative distribution function) with tails that are within 1%, 10% or 2× an ideal normal distribution up to a maximum number of standard deviations (sigma). For example, each scalar output from an f16v2 grand instruction is a sum of 12 uniformly distributed pseudo random values and the tails are within 10% of an ideal normal distribution up to 2.8 sigma.

To sum 12 grand instruction scalar outputs (a $144^{th}$ order Irwin-Hall distribution); the grand instruction should be executed 6 times and all 12 of the resulting scalar values summed. The final sum is the divided by sqrt (12) to retain a standard deviation of 1.

The output of the grand instruction can be used in combination with a sum of other uniformly distributed random variables to generate a 2-sigma or 3-sigma truncated normal distribution, An algorithm to generate a 2-sigma resp (3-sigma) can operate to generate two (resp.three) 'uniforms', each uniform being a random number from uniformly distributed random variables in the range −1 to +1

(from the PRNG), and sum them. Then for a 2-sigma distribution two normally distributed values N1, N2 are generated using the grand instruction described earlier. (For a 3-sigma distribution, a single normally distributed value N1 is generated). Note that N1, N2 correspond to outputs V1, V2 discussed earlier.

For the 2-sigma distribution, where |N1| or |N2| are greater than 2, the sum of uniforms is used as the output.

For the 3-sigma distribution, where |N1| is greater than 3, the sum of the uniforms is used instead.

The sum of two uniform random variables has the PDF (probability distribution function) represented by curve (a) in FIG. 6: only very roughly Gaussian, but definitely limited to +−2 sigma. The truncated Gaussian distribution that the algorithm is trying to match is illustrated by curve (b).

If both of the Gaussian variables are out of range (beyond 2 sigma) then the sum of two uniforms is used instead.

Since it is unlikely that both Gaussians are out of range; the sum of two uniforms is used only rarely (about 1/500 times) and its effect on the average distribution is therefore very slight.

The algorithm for generating 3-sigma truncated Gaussian values is slightly different. This time only one Gaussian variable is needed because the likelihood of a single value exceeding 3-sigma range is already slight (about 1/500).

Figure 7:
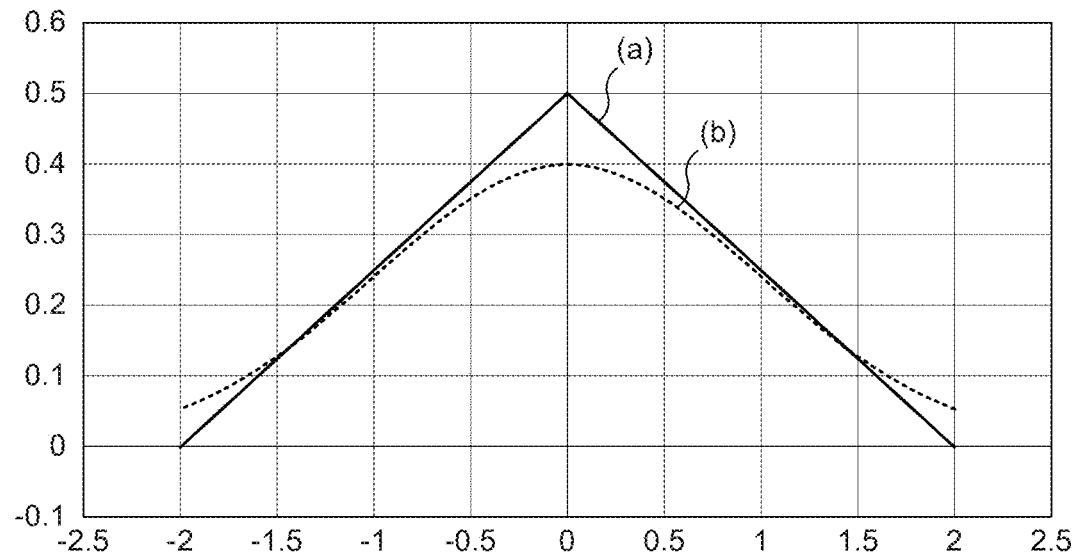
FIGS. 7 and 8 are graphs comparing distributions.
Figure 8:
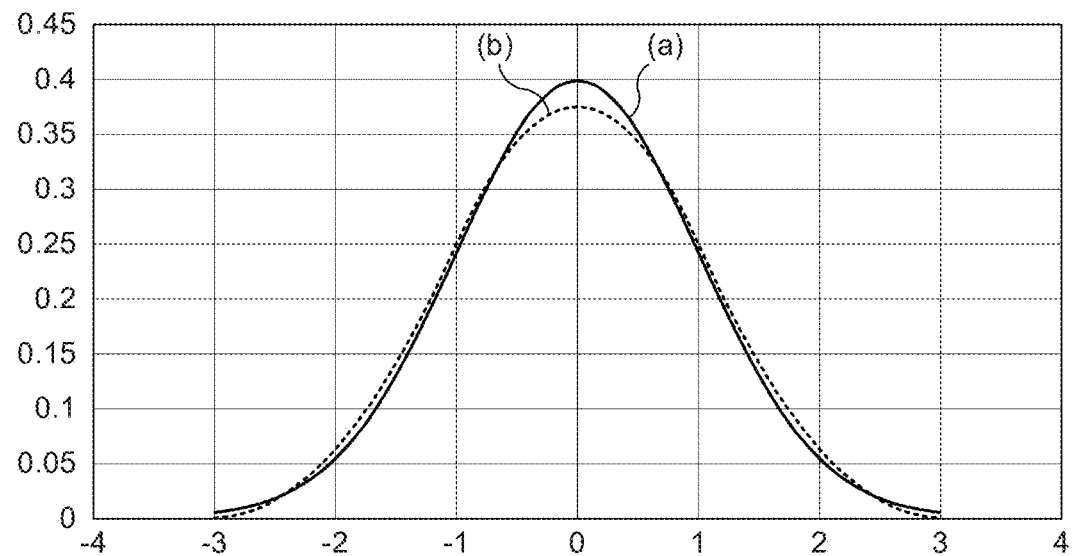

The sum of three uniform random variables has the PDF represented by the curve (a) in FIG. 7. It is roughly Gaussian and definitely limited to +−3 sigma. The truncated Gaussian distribution that the algorithm is trying to match is illustrated by curve (b). If the Gaussian variable is out of range (beyond 3 sigma) then the sum of three uniforms is used instead.

The error of the resulting distribution is very small since the sum of 3 uniforms is already a fairly good approximation of a 3-sigma truncated Gaussian distribution and it is used only ~1/500 times.

The term 'random' used herein can mean 'truly random' or 'pseudorandom'. The grand instruction could use either a pseudorandom or a true random bit sequence generator.

Pseudorandom numbers are generated by a 'pseudorandom number generator' or 'PRNG'. PRNG's can be implemented in software or hardware. True random numbers are generated by a 'true random number generator' or 'TRNG'. An example of a TRNG is a "Transition Effect Ring Oscillator". An advantage of PRNGs over TRNGs is determinism (running the same program twice with the same starting conditions always has the same result).

An advantage of TRNGs over PRNGs is that the output is truly random (while the output of a PRNG satisfies a finite set of arbitrarily chosen mathematical properties; the state and output of a PRNG is always predictable from the current state and therefore not truly random).

While particular embodiments have been described, other applications and variance of the disclosed techniques may become apparent to a person skilled in the art once given the disclosure hearing. The scope of the present disclosure is not limited by the described embodiments but only by the accompanying claims.

What is claimed is:

1. An execution unit configured to execute a computer program instruction to generate random numbers based on a predetermined probability distribution, the execution unit comprising:
    a hardware pseudorandom number generator configured to generate at least one randomised bit string on execution of the instruction;
    adding circuitry configured to receive a number of bit sequences of a predetermined bit length selected from the randomised bit string and to sum them to produce a result; and
    normalising circuitry configured to receive the result and to provide a normalised result.

2. An execution unit according to claim 1, wherein providing the normalised result comprises using a lookup table to receive the result and to provide the normalised result.

3. An execution unit according to claim 1, wherein the hardware pseudorandom number generator is configured to generate two or more randomised bit strings on execution of the instruction, and wherein the adding circuitry is configured to produce two or more results from two or more respective summations.

4. An execution unit according to claim 1, wherein the normalising circuitry is configured to subtract a first number from the result, the first number being calculated as half the total possible number range of results produced by the adding circuitry.

5. An execution unit according to claim 1, wherein the number of bit sequences is 12.

6. An execution unit according to claim 5, wherein the normalising circuitry is configured to subtract 186 from the result.

7. An execution unit according to claim 1, wherein the normalising circuitry is configured to, as part of generating the normalised result, divide an intermediate value derived from the at least one randomised bit string by a number which is the number of possible values of uniformly distributed random variables having the predetermined bit length.

8. An execution unit according to claim 7, wherein the normalising circuitry is configured to divide the intermediate value by 32.

9. An execution unit according to claim 1, wherein the bit length of each sequence is 5.

10. An execution unit according to claim 1, wherein the predetermined probability distribution approximates a scaled, offset, quantized Irwin-Hall distribution.

11. An execution unit according to claim 1, wherein the execution unit is configured to execute the computer program instruction a plurality of times to obtain a plurality of results, the execution unit comprising summing circuitry which sums together the plurality of results to fit the predetermined probability distribution.

12. An execution unit according to claim 1, wherein the hardware pseudorandom number generator is configured to generate at least one further randomised bit string, wherein the execution unit comprises summing circuitry configured to combine one or more bit sequences from the at least one further randomised bit string with the normalised result.

13. An execution unit according to claim 1, wherein the normalising circuitry is configured to receive the result and to generate the normalised result to an item selected from the list consisting of: centre the predetermined probability distribution at a selected known value; and adjust the variance of the distribution to a selected known value.

14. A method of executing a computer program instruction to generate random numbers based on a predetermined probability distribution, the method comprising:
    generating at least one randomised bit string on execution of the instruction;

selecting a plurality of bit sequences of a predetermined bit length from the randomised bit string and summing the bit sequences to produce a result; and normalising the result.

15. A method according to claim 14, wherein responsive to the instruction, two or more randomised bit strings are generated and two or more results are produced from two or more respective summations.

16. A method according to claim 14, wherein normalizing the result includes using a look up table.

17. A method according to claim 14, wherein a number of bit sequences is 12.

18. A method according to claim 14, wherein a bit length of each sequence is 5.

19. A method according to claim 14, wherein normalising includes an item selected from the list consisting of: generating a normalised result to centre the predetermined probability distribution at a selected known value; and adjusting the variance of the distribution to a selected known value.

20. A non-transitory computer readable medium comprising a computer program which comprises a computer program instruction which when executed carries out a method of generating random numbers based on a predetermined probability distribution, the method comprising:

generating at least one randomised bit string on execution of the instruction;

selecting a plurality of bit sequences of a predetermined bit length from the randomised bit string and summing the bit sequences to produce a result; and providing a normalised result from the result.

* * * * *